United States Patent
Ma (10) Patent No.: US 12,223,622 B2
(45) Date of Patent: Feb. 11, 2025

(54) IMAGE FUSION METHOD AND DEVICE (71) Applicant: HANGZHOU EZVIZ SOFTWARE CO., LTD., Hangzhou (CN)

(72) Inventor: Shijie Ma, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 200 days.

(21) Appl. No.: 18/003,916

(22) PCT Filed: Jul. 7, 2021

(86) PCT No.: PCT/CN2021/104976
§ 371 (c)(1),
(2) Date: Dec. 30, 2022

(87) PCT Pub. No.: WO2022/007840
PCT Pub. Date: Jan. 13, 2022

(65) Prior Publication Data
US 2023/0325994 A1    Oct. 12, 2023

(30) Foreign Application Priority Data

Jul. 8, 2020  (CN) .......................... 202010649911.2

(51) Int. Cl.
*G06T 5/50* (2006.01)
*G06T 3/40* (2024.01)
(Continued)

(52) U.S. Cl.
CPC .................. *G06T 5/50* (2013.01); *G06T 3/40* (2013.01); *G06T 5/70* (2024.01); *H04N 23/61* (2023.01);
(Continued)

(58) Field of Classification Search
CPC .... G06T 5/50; G06T 3/40; G06T 5/70; G06T 2207/20221; G06T 2207/10148;
(Continued)

(56) References Cited

U.S. PATENT DOCUMENTS

2012/0026366 A1    2/2012  Golan et al.
2013/0329095 A1*  12/2013  Aoki .................... H04N 23/672
                                                              348/241

(Continued)

FOREIGN PATENT DOCUMENTS

CN    103841313    6/2014
CN    105578036    5/2016
(Continued)

OTHER PUBLICATIONS

Gui-ran et al., "Dual-focal camera continuous digital zoom based on CNN and feature extraction", *Journal of Zhejiang University (Engineering Science)*, 53(6), 1182-1189, 2019.

(Continued)

*Primary Examiner* — Usman A Khan
(74) *Attorney, Agent, or Firm* — NORTON ROSE FULBRIGHT US LLP (57) ABSTRACT

An image fusion method and device is disclosed, which includes: obtaining a first short-focus image and a first long-focus image acquired by a short-focus sensor and a long-focus sensor at the same time; calculating a reduction coefficient corresponding to the first long-focus image when the sizes of the same target in the first long-focus image and the first short-focus image are matched; performing a reduction processing on the first long-focus image according to the reduction coefficient to obtain a second long-focus image; according to a relative angle of the current long-focus lens and short-focus lens, calculating a position of the second long-focus image in the first short-focus image when (Continued)

the positions of the same target in the second long-focus image and the first short-focus image are matched; and covering the first short-focus image by the second long-focus image to obtain a fused image.

11 Claims, 5 Drawing Sheets

(51) Int. Cl.
  *G06T 5/70* (2024.01)
  *H04N 23/61* (2023.01)
  *H04N 23/695* (2023.01)
  *H04N 23/951* (2023.01)
(52) U.S. Cl.
  CPC ......... *H04N 23/695* (2023.01); *H04N 23/951* (2023.01); *G06T 2207/20221* (2013.01)
(58) Field of Classification Search
  CPC .... H04N 23/61; H04N 23/695; H04N 23/951; H04N 7/181; H04N 23/958
  USPC ....................................................... 348/222.1
  See application file for complete search history.

(56) References Cited

U.S. PATENT DOCUMENTS

| | | |
|---|---|---|
| 2016/0080657 A1 | 3/2016 | Chou et al. |
| 2018/0048825 A1 | 2/2018 | Wang |
| 2018/0096487 A1* | 4/2018 | Nash ................. H04N 25/60 |

FOREIGN PATENT DOCUMENTS

| | | |
|---|---|---|
| CN | 106254777 | 12/2016 |
| CN | 107959805 | 4/2018 |
| CN | 108353118 | 7/2018 |
| CN | 108900763 | 11/2018 |
| CN | 109120883 | 1/2019 |
| CN | 109285136 | 1/2019 |
| CN | 110460748 | 11/2019 |
| CN | 110622497 | 12/2019 |
| CN | 110855883 | 2/2020 |
| CN | 110868541 | 3/2020 |
| CN | 110913131 | 3/2020 |
| CN | 111818304 | 10/2020 |
| JP | 2006238325 | 9/2006 |
| JP | 2007065513 | 3/2007 |
| WO | WO 2018072657 | 4/2018 |
| WO | WO 2020043155 | 3/2020 |

OTHER PUBLICATIONS

International Search Report and Written Opinion issued in corresponding PCT Application No. PCT/CN2021/104976, dated Oct. 13, 2021 (English translation provided).
Extended European Search Report issued in corresponding European Application No. 21837892.5, dated Oct. 30, 2023.

* cited by examiner

IMAGE FUSION METHOD AND DEVICE

CROSS REFERENCE TO RELATED APPLICATIONS

The present application is a national phase application under 35 U.S.C. § 371 of International Application No. PCT/CN2021/104976, filed Jul. 7, 2021, which claims the benefit of priority to Chinese patent application No. 202010649911.2 filed with the State Intellectual Property Office of People's Republic of China on Jul. 8, 2020 and entitled "Image Fusion Method and Device", each of which are incorporated herein by reference in their entirety.

TECHNICAL FIELD

The present application relates to the technical field of image processing, in particular to an image fusion method and device.

BACKGROUND

In the video surveillance scene with a large monitoring range, in order to expand the coverage of the surveillance scene and simultaneously monitor and playback the images of multiple cameras. An imaging system composed of multi-channel cameras linked together has emerged in the prior art. However, the system is complex to set up, ten cameras are required to jointly input, and the image synthesis module need to be accessed additionally in the middle, which results in a huge amount of processing data, a high overall cost and a limited monitoring angle.

SUMMARY

The embodiment of the present application provides an image fusion method and device, so that on the premise of considering the monitoring range and the definition, the monitoring cost is reduced, and the monitoring efficiency is improved. The specific technical solution is as follows.

In a first aspect, the embodiment of the present application provides an image fusion method, which includes: obtaining a first short-focus image and a first long-focus image respectively acquired by a short-focus sensor and a long-focus sensor at the same time; according to the focal lengths of a short-focus lens and a long-focus lens, calculating a reduction coefficient corresponding to the first long-focus image when the sizes of the same target in the first long-focus image and in the first short-focus image are matched; performing a reduction processing on the first long-focus image according to the reduction coefficient to obtain a second long-focus image; according to a relative angle of the current long-focus lens and the short-focus lens, calculating a position of the second long-focus image in the first short-focus image when the positions of the same target in the second long-focus image and in the first short-focus image are matched; and according to the position of the second long-focus image in the first short-focus image, covering the first short-focus image by the second long-focus image to obtain a fused image. Wherein, the short-focus sensor is connected to the short-focus lens, the long-focus sensor is connected to the long-focus lens, and both the short-focus sensor and the long-focus sensor rotate with the Pan-Tilt platform at the same time, or, the short-focus sensor is fixed and only the long-focus sensor rotates with the Pan-Tilt platform.

In a possible implementation, the method further includes: detecting a target in the short-focus image acquired by the short-focus sensor and the long-focus image acquired by the long-focus sensor in real time; and if the target is detected in the short-focus image or the long-focus image, controlling the Pan-Tilt platform to rotate until the target is located in the center of the short-focus image or the long-focus image, and when the target is located in the center of the short-focus image or the long-focus image, controlling the Pan-Tilt platform to stop rotating.

In a possible implementation, after obtaining the first short-focus image and the first long-focus image respectively acquired by the short-focus sensor and the long-focus sensor at the same time, and before calculating the reduction coefficient corresponding to the first long-focus image when the sizes of the same target in the first long-focus image and in the first short-focus image are matched, the method further includes: cropping the first short-focus image according to the preset short-focus field of view cropping coefficient, so that the field of view corresponding to the second short-focus image obtained after cropped is equal to the field of view corresponding to the first short-focus image multiplied by said short-focus field of view cropping coefficient; enlarging the second short-focus image to the same size as the first short-focus image to obtain a third short-focus image; according to the focal lengths of a short-focus lens and a long-focus lens, calculating a reduction coefficient corresponding to the first long-focus image when the sizes of the same target in the first long-focus image and in the first short-focus image are matched including: according to the focal lengths of the short-focus lens and the long-focus lens and the short-focus field of view cropping coefficient, calculating the reduction coefficient corresponding to the first long-focus image when the sizes of the same target in the first long-focus image and in the third short-focus image are matched; according to a relative angle of the current long-focus lens and short-focus lens, calculating a position of the second long-focus image in the first short-focus image when the positions of the same target in the second long-focus image and in the first short-focus image are matched including: according to the relative angle of the current long-focus lens and short-focus lens and the short-focus field of view cropping coefficient, calculating a position of the second long-focus image in the third short-focus image when the positions of the same target in the second long-focus image and in the third short-focus image are matched; and according to the position of the second long-focus image in the first short-focus image, covering the first short-focus image by the second long-focus image including: according to the position of the second long-focus image in the third short-focus image, covering the third short-focus image by the second long-focus image.

In a possible implementation, after obtaining the first short-focus image and the first long-focus image respectively acquired by the short-focus sensor and the long-focus sensor at the same time, and before cropping the first short-focus image according to the preset short-focus field of view cropping coefficient, the method further includes: determining whether the field of view obtained by multiplying the field of view corresponding to the first short-focus image by said short-focus field of view cropping coefficient is smaller than the field of view corresponding to the first long-focus image, if yes, directly cropping the first long-focus image, so that the field of view of the second long-focus image obtained after cropping is equal to the field of view obtained by multiplying the field of view corresponding to the first short-focus image by said short-focus field of view cropping coefficient, enlarging the second long-focus image to the same size as the first short-focus image to obtain the final fused image; furthermore, if the field of view obtained by multiplying the field of view corresponding to the first short-focus image by said short-focus field-of-view cropping coefficient is equal to the field of view corresponding to the first long-focus image, directly using the first long-focus image as the final fused image; if the field of view obtained by multiplying the field of view corresponding to the first short-focus image by said short-focus field-of-view cropping coefficient is larger than the field of view corresponding to the first long-focus image, performing the action that cropping the first short-focus image according to the preset short-focus field of view cropping coefficient.

In a possible implementation, before obtaining the fused image, the method further includes: performing a smoothing processing on the edges of the second long-focus image in the fused image.

In a possible implementation, the method further includes: setting the size of a first transparency image to be equal to the size of the first long-focus image, and setting the widths W of transition bands in pixels; wherein, the transition bands are located at four edges of the first transparency image and within the boundary of the first transparency image; for each of the transition bands at the four edges, setting values of individual pixels on the transition band so that the values of the individual pixels increase in order from the boundary of the first transparency image to the interior of the image, in a range from 0 to 255; furthermore, performing a smoothing processing on the edges of the second long-focus image in the fused image includes: performing a reduction processing on the transparency image by using the reduction coefficient corresponding to the first long-focus image to obtain the second transparency image; performing a coincidence of the center of the second transparency image with the center of the second long-focus image in the fused image, and for each pixel in the fused image that coincides with the transition bands of the second transparency image, replacing the pixel value of the pixel by: (the pixel value of the pixel in the second transparency image*the pixel value of the pixel in the second long-focus image in the fused image+(255−the pixel value of the pixel in the second transparency image)*the pixel value of the pixel in the covered third short-focus image in the fused image/255.

In a possible implementation, for each of the transition bands at the four edges, setting the values of the individual pixels on the transition band so that the values of the individual pixels increase in order from the boundary of the first transparency image to the interior of the image, in range from 0 to 255, includes: for transition band at each of the edges, the pixel values of the pixels from the boundary of the transition band to the center of the transition band are fitted by a first quadratic function of one variable, the pixel values of the pixels from the center of the transition band to the end of the transition band are fitted by a second quadratic function of one variable, wherein the quadratic coefficient of the first quadratic function with one variable is greater than 0, and the quadratic coefficient of the second quadratic function with one variable is less than 0.

In a second aspect, the embodiment of the present application provides an image fusion method, which includes: obtaining a first short-focus image and a first long-focus image corresponding to the current time that an image is to be output, wherein the acquisition time of the first short-focus image is the same as that of the first long-focus image, and the range of the field of view of the first long-focus image is within the range of the field of view of the first short-focus image; determining whether the range of the field of view corresponding to the current image to be output is larger than the range of the field of view of the first long-focus image; if the range of the field of view corresponding to the current image to be output is larger than the range of the field of view range of the first long-focus image, extracting, according to the range of the field of view corresponding to the current image to be output, an image area for the corresponding range of the field of view in the first short-focus image to obtain a second short-focus image; determining the target area corresponding to the range of the field of view of the first long-focus image in the second long-focus image; superposing the first long-focus image that has been adjusted to the size of the target area on the target area of the second long-focus image to obtain a fused image; enlarging said fused image to a preset resolution and outputting the enlarged fused image.

In a third aspect, the embodiment of the present application provides an image fusion device, which includes a memory and a processor that can access the memory having storing therein instructions which, when executed by the processor, cause the processor to perform any one of the image fusion methods described in the present application.

In the fourth aspect, the embodiment of the present application provides a binocular long-focus and short-focus Pan-Tilt camera, which includes: a short-focus sensor connected to a short-focus lens, a long-focus sensor connected to a long-focus lens and a Pan-Tilt platform, wherein the short-focus sensor and the long-focus sensor rotate with the Pan-Tilt platform at the same time, or, the short-focus sensor is fixed and only the long-focus sensor rotates with the Pan-Tilt platform; in addition, the short-focus sensor and the long-focus sensor are respectively provided with an interface for communicating with the image fusion device, and send the original short-focus image and the original long-focus image respectively acquired to the image fusion device through the respective communication interfaces.

In the fifth aspect, the embodiment of the present application provides an image fusion system, which includes the binocular long-focus and short-focus Pan-Tilt camera described above and the image fusion device described above.

In the embodiment of the present application, after the target registration of the long-focus image and the short-focus image acquired by binocular long-focus and short-focus cameras, the short-focus image is covered by the long-focus image, thereby improving the definition of the fused image while retaining the wide field of view of the short-focus lens; only one short-focus lens and one long-focus lens are needed, and the data to be processed is less, which reduces the monitoring cost and improves the monitoring efficiency.

BRIEF DESCRIPTION OF THE DRAWINGS

In order to more clearly explain the embodiments of the present application and the technical solutions of the prior art, the following is a brief description of the drawings needed in the embodiments and the prior art. Obviously, the drawings in the following description are only some embodiments of the present application, and for those ordinary skilled in the art, other drawings can be obtained from these drawings without creative effort.

DETAILED DESCRIPTION

In order to make the purpose, technical solutions and advantages of the present application clearer, the present application will be further explained in detail with reference to the attached drawings and embodiments. Obviously, the described embodiments are only part of the embodiments of the present application, but not all of them. Based on the embodiments in the present application, all other embodiments obtained by ordinary skilled in the art without creative fall within the scope of protection in the present application.

In order to give consideration to both the monitoring range and the definition, reduce the monitoring cost, and improve the monitoring efficiency, the embodiment of the present application provides the following solutions.

The embodiment of the present application firstly proposes a binocular long-focus and short-focus Pan-Tilt camera. The Pan-Tilt platform may rotate horizontally by 360 degrees and vertically by 5 to −85 degrees. There are two lenses and two sensors, and the two lenses are a long-focus lens and a short-focus lens, respectively. The focal length of the long-focus lens is larger than that of the short-focus lens, and the focal lengths of the long-focus lens and the short-focus lens may be customized and selected according to the actual situation. The short-focus lens has a large field of view and can cover a large monitoring range, while the long-focus lens has a small field of view and but with higher clarity. The focal length refers to the distance from the center of the lens to the focus of light gathering. Generally, a focal length of 6 mm or more is called long-focus, and less than 6 mm is called long-focus.

The two sensors are respectively a short-focus sensor and a long-focus sensor, the short-focus sensor is used for receiving the optical signal acquired by the short-focus lens, and the long-focus sensor is used for receiving the optical signal acquired by the long-focus lens; the resolutions of the short-focus sensor and the long-focus sensor may be the same or different, which is not specifically limited in the present application.

The form of the binocular long-focus and short-focus Pan-Tilt camera proposed in the embodiment of the present application may be a fixed short-focus lens and a long-focus lens rotating with the Pan-Tilt platform, or, both the long-focus and short-focus lenses rotating with the Pan-Tilt platform at the same time and the relative position thereof remaining unchanged.

Figure 1:
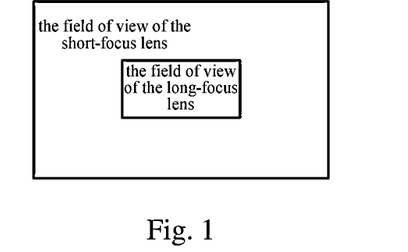
FIG. 1 is an exemplary diagram of the positional relationship of the fields of view of the long-focus and short-focus lenses when they rotate with the binocular long-focus and short-focus Pan-Tilt camera according to an embodiment of the present application at the same time.

The embodiment of the present application requires that: the picture of the long-focus lens is always in the field of view of the long-focus lens. Wherein:

1. If the long-focus and short-focus lenses rotate with the Pan-Tilt platform at the same time, an example of the positional relationship between the two fields of view is shown in FIG. 1. Wherein, the area contained in the large rectangle represents the field of view of the short-focus lens, and the area contained in the small rectangle represents the field of view of the long-focus lens. The resolutions of the long-focus and short-focus sensors may be the same or different. For example, in order to ensure the resolution of the long-focus lens, the resolution of the long-focus sensor may be 1080P or more.

Figure 2:
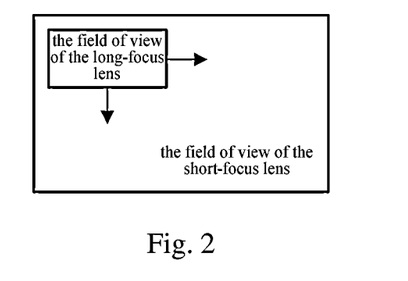
FIG. 2 is an exemplary diagram of the positional relationship of the fields of view of the long-focus and short-focus lenses when the short-focus lens is fixed and the long-focus lens is movable in the binocular long-focus and short-focus Pan-Tilt camera according to an embodiment of the present application.

2. If the short-focus lens is fixed and the long-focus lens is movable, an example of the positional relationship between the two fields of view is shown in FIG. 2. Wherein, the area contained in the large rectangle represents the field of view of the short-focus lens, and the area contained in the small rectangle represents the field of view of the long-focus lens. When the Pan-Tilt platform rotates, the picture of the long-focus lens may move left and right or up and down in the direction of the arrow within the picture of the short-focus lens.

Figure 3:
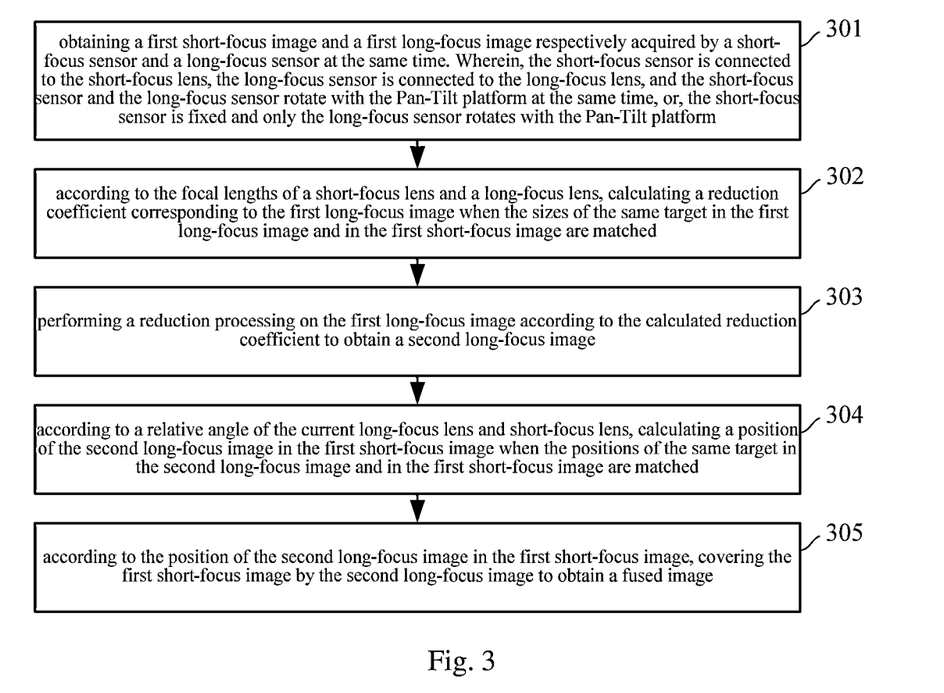
FIG. 3 is a flowchart of an image fusion method according to an embodiment of the present application.

FIG. 3 is a flowchart of an image fusion method according to an embodiment of the present application, and the specific steps are as follows:

Step 301: obtaining a first short-focus image and a first long-focus image respectively acquired by a short-focus sensor and a long-focus sensor at the same time. Wherein, the short-focus sensor is connected to the short-focus lens, the long-focus sensor is connected to the long-focus lens, and the short-focus sensor and the long-focus sensor rotate with the Pan-Tilt platform at the same time, or, the short-focus sensor is fixed and only the long-focus sensor rotates with the Pan-Tilt platform. The first short-focus image is the image acquired by the short-focus sensor, and the first long-focus image is the image acquired by the long-focus sensor.

The image fusion method of the present embodiment may be realized by electronic apparatus, specifically, the electronic apparatus may be cameras, hard disk recorders, smart phones, personal computers or servers, etc.

Step 302: according to the focal lengths of a short-focus lens and a long-focus lens, calculating a reduction coefficient corresponding to the first long-focus image when the sizes of the same target in the first long-focus image and in the first short-focus image are matched.

That is, since the field of view of the long-focus lens is smaller than that of the short-focus lens, the size of a target in the long-focus image is larger than the size of the same target in the short-focus image. To fuse the long-focus image with the short-focus image, the first long-focus image must be scaled so that the size of the target in the scaled first long-focus image is the same as the size of the same target in the short-focus image.

Step 303: performing a reduction processing on the first long-focus image according to the calculated reduction coefficient to obtain a second long-focus image.

The size of the target in the image is proportional to the size of the focal length. In one example, the ratio of the focal length of the long-focus lens to the focal length of the long-focus lens may be directly calculated to obtain the reduction coefficient X. The length and width of the first long-focus image by are reduced X times to obtain the second long-focus image.

Step 304: according to a relative angle of the current long-focus lens and short-focus lens, calculating a position of the second long-focus image in the first short-focus image when the positions of the same target in the second long-focus image and in the first short-focus image are matched.

In one example, for the case that the long-focus lens and the short-focus lens rotate with the Pan-Tilt platform at the same time, the positional relationship of the fields of view of both is fixed, as shown in FIG. 1. In this case, the position of the center point of the second long-focus image in the first short-focus image may be calibrated in advance; then, based on the position of the center point of the second long-focus image in the first short-focus image, and the size of the second long-focus image, the position of the second long-focus image in the first short-focus image is determined.

In one example, for the case that the long-focus lens is movable and the short-focus lens is fixed, the positions of the center point of the second long-focus image in the first short-focus image at different relative angles may be calibrated in advance; then, based on the relative angle of the current long-focus lens and short-focus lens, the position of the center point of the current second long-focus image in the first short-focus image is determined, and the position of the second long-focus image in the first short-focus image is determined in combination with the size of the second long-focus image.

Step 305: according to the position of the second long-focus image in the first short-focus image, covering the first short-focus image by the second long-focus image to obtain a fused image.

The beneficial technical effects of the above embodiments are as follows:
- firstly, after the target registration of the long-focus image and the short-focus image acquired by binocular long-focus and short-focus cameras, the short-focus image is covered by the long-focus image, thereby improving the definition of the fused image while retaining the wide field of view of the short-focus lens;
- secondly, only one short-focus lens and one long-focus lens are needed, and the data to be processed is less, which is convenient for the real-time realization of the embedded system, reduces the monitoring cost, and improves the monitoring efficiency;
- thirdly, implementation is easy without hardware zoom and hardware focus.

In an optional embodiment, a target in the short-focus image acquired by the short-focus sensor and the long-focus image acquired by the long-focus sensor is detected in real time; and if the target is detected in the short-focus image or the long-focus image, the Pan-Tilt platform is controlled to rotate until the target is located in the center of the short-focus image or the long-focus image, and when the target is located in the center of the short-focus image or the long-focus image, the Pan-Tilt platform is controlled to stop rotating.

According to the above embodiment, when the target is detected, the target may in the center of the short-focus or long-focus lens by rotating the Pan-Tilt platform, thus improving the monitoring effect of the final fused image.

Figure 4:
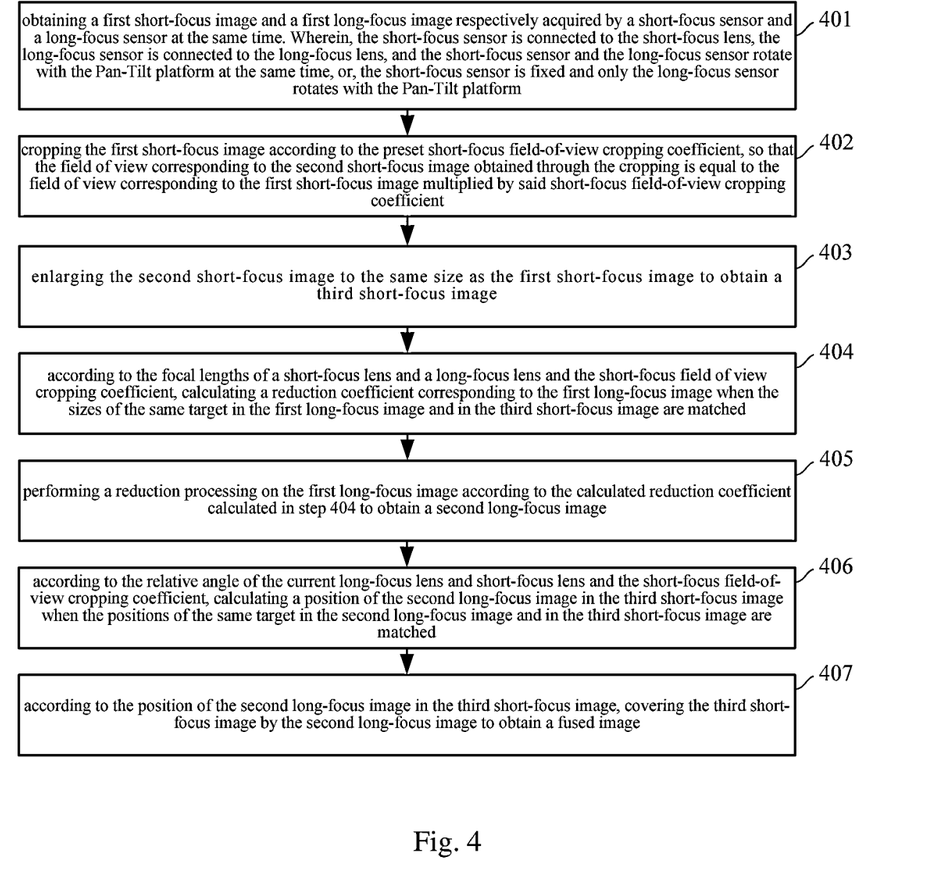
FIG. 4 is a flowchart of an image fusion method according to another embodiment of the present application.

FIG. 4 is a flowchart of an image fusion method provided in another embodiment of the present application, and the specific steps are as follows:

Step 401: obtaining a first short-focus image and a first long-focus image respectively acquired by a short-focus sensor and a long-focus sensor at the same time. Wherein, the short-focus sensor is connected to the short-focus lens, the long-focus sensor is connected to the long-focus lens, and the short-focus sensor and the long-focus sensor rotate with the Pan-Tilt platform at the same time, or, the short-focus sensor is fixed and only the long-focus sensor rotates with the Pan-Tilt platform.

Step 402: cropping the first short-focus image according to the preset short-focus field-of-view cropping coefficient, so that the field of view corresponding to the second short-focus image obtained through the cropping is equal to the field of view corresponding to the first short-focus image multiplied by said short-focus field-of-view cropping coefficient.

The short-focus field-of-view cropping coefficient is set by the user, etc. The field of view of the short-focus lens is large, in order to make the target in the short-focus lens picture clearer, the field of view of the short-focus lens may be cropped first, that is, the first short-focus image is cropped, the edge part is cropped off, and then the second short-focus image obtained through the cropping is enlarged, so that the target is enlarged and the definition of the image is improved.

Figure 5:
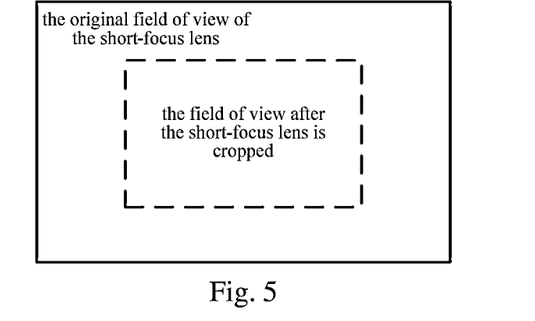
FIG. 5 is a schematic view of field of view cropping according to an embodiment of the present application.

As shown in FIG. 5, the large rectangle represents the original field of view of the short-focus lens, and the small rectangle represents the field of view of the short-focus lens after cropping, thus short-focus field-of-view cropping coefficient may be expressed by the ratio of the area of the large rectangle to the area of the small rectangle, and of course it may also be expressed by the ratio of the area of the small rectangle to the area of the large rectangle, which is not limited in the present application.

Step 403: enlarging the second short-focus image to the same size as the first short-focus image to obtain a third short-focus image.

Step 404: according to the focal lengths of a short-focus lens and a long-focus lens and the short-focus field-of-view cropping coefficient, calculating a reduction coefficient corresponding to the first long-focus image when the sizes of the same target in the first long-focus image and in the third short-focus image are matched.

Step 405: performing a reduction processing on the first long-focus image according to the calculated reduction coefficient calculated in Step 404 to obtain a second long-focus image.

Step 406: according to the relative angle of the current long-focus lens and short-focus lens and the short-focus field-of-view cropping coefficient, calculating a position of the second long-focus image in the third short-focus image when the positions of the same target in the second long-focus image and in the third short-focus image are matched.

Step 407: according to the position of the second long-focus image in the third short-focus image, covering the third short-focus image by the second long-focus image to obtain a fused image.

In the above embodiment, before the first short-focus image and the first long-focus image are fused, the field of view of the first short-focus image is cropped, and then the second short-focus image obtained after the cropping is enlarged, thereby improving the definition of the third short-focus image participating in the fusion, that is, improving the definition of the fused image finally obtained.

In some scenes, the field of view corresponding to the first short-focus image multiplied by the short-focus field-of-view cropping coefficient may be less than or equal to the field of view of the first long-focus image. In this case, the first short-focus image may be directly discarded and the first long-focus image may be directly processed to obtain the final fused image. The details are as follows:

Before executing Step 402, whether the field of view corresponding to the first short-focus image multiplied by the short-focus field-of-view cropping coefficient is smaller than the field of view corresponding to the first long-focus image is firstly determined, if yes, the first long-focus image is directly cropped, so that the field of view of the second long-focus image obtained through the cropping is equal to the field of view obtained by multiplying the field of view corresponding to the first short-focus image by the short-focus field-of-view cropping coefficient, and the second long-focus image is enlarged to the same size as the first short-focus image to obtain the final fused image;

and, if the field of view obtained by multiplying the field of view corresponding to the first short-focus image by the short-focus field-of-view cropping coefficient is equal to the field of view corresponding to the first long-focus image, the first long-focus image is directly used as the final fused image;

if the field of view obtained by multiplying the field of view corresponding to the first short-focus image by the short-focus field-of-view cropping coefficient is larger than the field of view corresponding to the first long-focus image, Step 402 and subsequent steps are performed.

With the above embodiments, the field of view obtained by multiplying the field of view corresponding to the first short-focus image by the short-focus field-of-view cropping coefficient is less than or equal to the field of view corresponding to the first long-focus image, and only the first long-focus image with good definition is used to construct the fused image, thereby ensuring the definition of the fused image on the premise of meeting the field of view requirements of the fused image.

In the fused image obtained by the above embodiment, since the same size of the field of views of the long-focus and short-focus lenses, there may be an obvious sense of boundary at the juncture of the long-focus and short-focus images in the fused image. In order to smooth the sense of boundary, the edge of the second long-focus image in the fused image may be smoothed.

Figure 6:
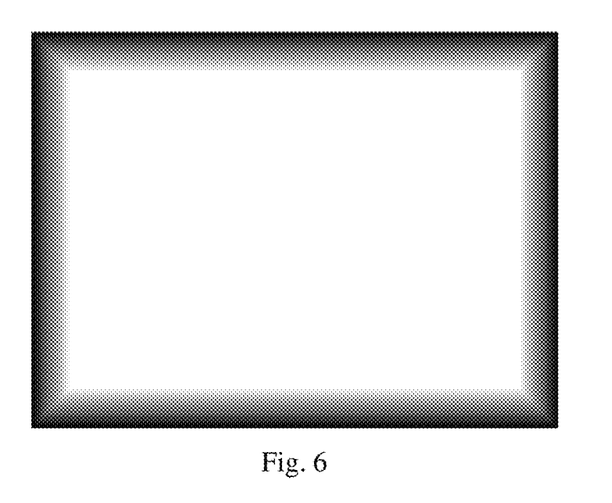
FIG. 6 is an exemplary diagram of a first transparency image according to an embodiment of the present application.

In an optional embodiment, the size of the first transparency image is set to be equal to the size of the first long-focus image, and the widths W of the transition bands is set in pixels; wherein, the transition band are located at four edges of the first transparency image and within the boundary of the first transparency image;

for each of the transition bands at the four edges, the values of individual pixels on the transition band are set so that the values of the individual pixels increase in order from the boundary of the first transparency image to the interior of the image, in a range from 0 to 255.

FIG. 6 is an exemplary diagram of the first transparency image.

Furthermore, performing a smoothing processing on the edges of the second long-focus image in the fused image includes:

performing a reduction processing on the transparency image by using the reduction coefficient corresponding to the first long-focus image calculated in Step 302 or Step 404 to obtain the second transparency image; performing a coincidence of the center of the second transparency image with the center of the second long-focus image in the fused image, and for each pixel in the fused image that coincides with the transition bands of the second transparency image, replacing the pixel value of the pixel by: (the pixel value of the pixel in the second transparency image*the pixel value of the pixel in the second long-focus image in the fused image+(255−the pixel value of the pixel in the second transparency image)*the pixel value of the pixel in the covered third short-focus image in the fused image)/255.

The beneficial technical effects of the above embodiments are as follows.

1. each of the transition band at the four edges of the transparency image is designed such that, the values of individual pixels on the transition band increase in order from the boundary of the first transparency image to the interior of the image, in a range from 0 to 255; and the pixel values of the pixels on the transition band are correlated with the weights of the corresponding pixels on the second long-focus image and the third short-focus image, and the juncture of the long-focus and short-focus images on the fused image is smoothed, which optimizes the display effect of the fused image;

2. a first transparency image with the same size as the first long-focus image is calculated in advance, and then the first transparency image is reduced according to the actual needs when the long-focus image and the short-focus image are fused, which reduces the time spent on smoothing in the image fusion process, speeds up the generation speed of the final fused image, and improves the monitoring efficiency.

In an optional embodiment, for each of the transition bands at the four edges, setting the values of individual pixels on the transition band so that the values of the individual pixels increase in order from the boundary of the first transparency image to the interior of the image, in a range from 0 to 255, includes:

for transition band at each of the edges, the pixel values of the pixels from the boundary of the transition band to the center of the transition band are fitted by a first quadratic function, and the pixel values of the pixels from the center of the transition band to the end of the transition band are fitted by a second quadratic function, wherein the quadratic coefficient of the first quadratic function is greater than 0, and the quadratic coefficient of the second quadratic function is less than 0.

In the above embodiments, when designing the transition band, the half of the transition band near the boundary is fitted with a quadratic function of one variable with quadratic coefficient greater than 0, and the other half is fitted with a quadratic function of one variable with quadratic coefficient less than 0, so that both ends of the finally fitted transition band, that is, one end near the boundary and one end near the center, have no protrusions, which optimizes the smoothing effect of the fused image.

In practical application, if the quadratic function of one variable with quadratic coefficient greater than 0 is set as $y1=a1x2+b1x+c1$, and the quadratic function of one variable with quadratic coefficient less than 0 is set as $y2=a2x22+b2x2+c2$, then:

a1, b1 and c1 are calculated according to (x1,y1)=(0,0). (x3,y3)=((x1+x2)/2, (y1+y2)/2) and the derivative at x1 is equal to 0; a2, b2 and c2 are calculated according to (x3,y3)=((x1+x2)/2, (y1+y2)/2) (x2,y2)=(W,255) and the derivative at x2 is equal to 0. Wherein, x1 is the coordinate of the starting point of the transition band near the boundary side of the transparent image, x2 is the coordinate of the ending point of the transition band near the inside of the transparent image, and x3 is the coordinate of the center point of the transition band. The calculation formulas are as follows:

$$\begin{bmatrix} a_1 \\ b_1 \\ c_1 \end{bmatrix} = \begin{bmatrix} x1^2 & x1 & 1 \\ x3^2 & x3 & 1 \\ 2x1 & 1 & 0 \end{bmatrix}^{-1} \begin{bmatrix} y1 \\ y3 \\ 0 \end{bmatrix}$$

$$\begin{bmatrix} a_2 \\ b_2 \\ c_2 \end{bmatrix} = \begin{bmatrix} x2^2 & x2 & 1 \\ x3^2 & x3 & 1 \\ 2x2 & 1 & 0 \end{bmatrix}^{-1} \begin{bmatrix} y2 \\ y3 \\ 0 \end{bmatrix}$$

The embodiment of the present application also provides an image fusion method, which includes the following steps:

Step 1, obtaining a first short-focus image and a first long-focus image corresponding to the current time that an image is to be output, wherein the acquisition time of the first short-focus image is the same as that of the first long-focus image, and the range of the field of view of the first long-focus image is within the range of the field of view of the first short-focus image.

Step 2, determining whether the range of the field of view corresponding to the current image to be output is larger than the range of the field of view range of the first long-focus image.

Step 3, if the range of the field of view corresponding to the current image to be output is larger than the range of the field of view range of the first long-focus image, extracting, according to the range of the field of view corresponding to the current image to be output, an image area for the corresponding range of the field of view in the first short-focus image to obtain a second short-focus image;

determining the target area corresponding to the range of the field of view of the first long-focus image in the second long-focus image;

Step 4, superposing the first long-focus image that has been adjusted to the size of the target area on the target area of the second long-focus image to obtain a fused image.

Step 5, enlarging said fused image to a preset resolution and outputting the enlarged fused image.

In an example, when a specified target is detected in a short-focus image, the lens of the apparatus is controlled to rotate to the position where the specified target is detected, and the electronic amplification function is enabled, the angle of view (the range of the field of view) of the short-focus image is cropped step by step, and the long-focus image is spliced into the cropped image. Since the angle of view of the short-focus image acquired in the front section is not lost, the detection and video recording may save the field of view before zooming. Compared with the camera with zoom lens, this implementation is electronic amplification, of which the calculation is fast, the center comes from a long-focus image, and the picture is clear without the refocusing process and the loss problems of the angle of view of a zoom lens.

Specifically, the range of the field of view may be determined according to the image center and zoom size.

In a possible implementation, after determining whether the range of the field of view corresponding to the current image to be output is larger than the range of the field of view of the first long-focus image, the method further includes: if the range of the field of view corresponding to the current image to be output is not larger than the range of the field of view range of the first long-focus image, extracting, according to the range of the field of view corresponding to the current image to be output, an image area for the corresponding range of the field of view in the first long-focus image to obtain a second long-focus image; enlarging the second long-focus image to a preset resolution and outputting the enlarged fused image.

In one example, when the enlargement ratio is larger than that of the long-focus image, that is, the field of view corresponding to the current image to be output is smaller than the field of view of the long-focus image, the second long-focus image is extracted from the first long-focus image, the second long-focus image is enlarged to a preset resolution and then the enlarged fused image is output. When the field of view corresponding to the current image to be output is equal to the field of view of the long-focus image, the first long-focus image is directly enlarged to a preset resolution and then output without extracting the first long-focus image.

In a possible implementation, before superposing the first long-focus image that has been adjusted to the size of the target area on the target area of the second long-focus image to obtain a fused image, the method further includes: setting the size of the first transparency image to be equal to the size of the first long-focus image, and setting the widths W of the transition bands in pixels; wherein, the transition band are located at four edges of the first transparency image and within the boundary of the first transparency image; for each of the transition bands at the four edges, setting values of individual pixels on the transition band so that the values of the individual pixels increase in order from the boundary of the first transparency image to the interior of the image, in a range from 0 to 255; performing a coincidence the center of the first transparency image with the center of the first long-focus image, and for each pixel in the fused image that coincides with the transition band of the first transparency image, replacing the pixel value of the pixel by: (the pixel value of the pixel in the first transparency image*the pixel value of the pixel in the first long-focus image in the fused image+(255−the pixel value of the pixel in the first transparency image)*the pixel value of the pixel in the covered second short-focus image in the fused image)/255.

In a possible implementation, for each of the transition bands at the four edges, setting the values of individual pixels on the transition band so that the values of the individual pixels increase in order from the boundary of the first transparency image to the interior of the image, in a range from 0 to 255, includes that: for transition band at each of the edges, the pixel values of the pixels from the boundary of the transition band to the center of the transition band are fitted by a first quadratic function of one variable, the pixel values of the pixels from the center of the transition band to the end of the transition band are fitted by a second quadratic function of one variable, wherein the quadratic coefficient of the first quadratic function with one variable is greater than 0, and the quadratic coefficient of the second quadratic function with one variable is less than 0.

Figure 7:
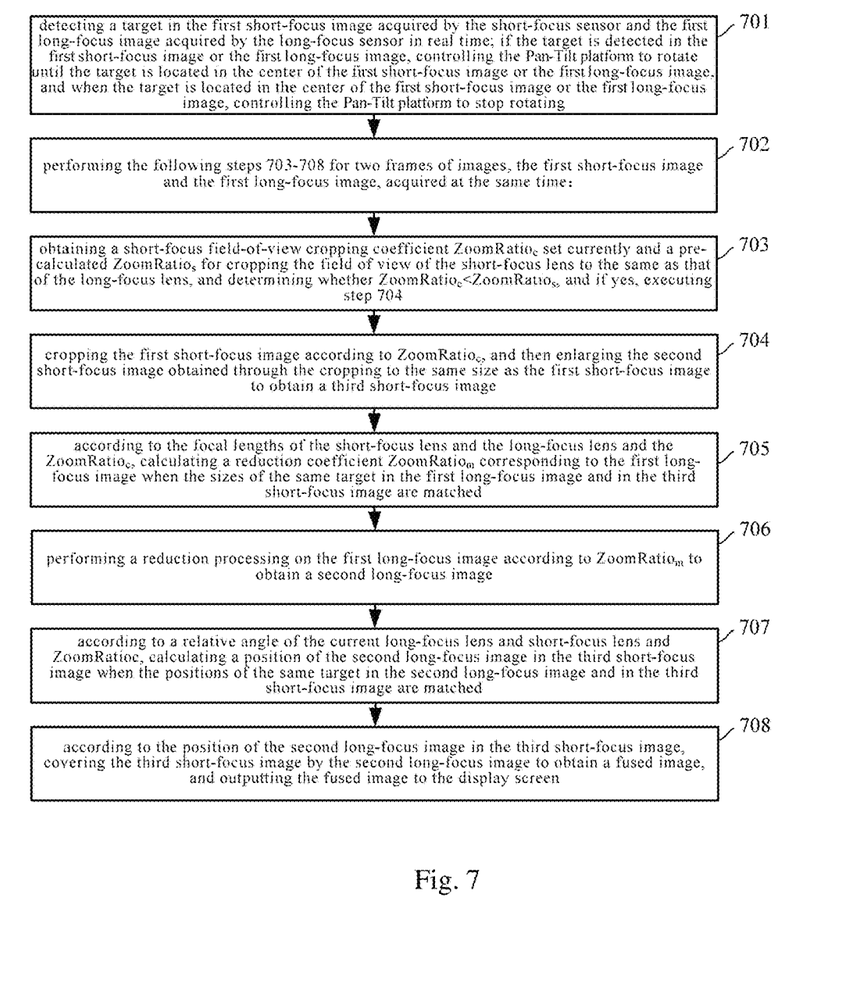
FIG. 7 is a flowchart of an image fusion method according to another embodiment of the present application.

FIG. 7 is a flowchart of an image fusion method according to another embodiment of the present application, and the specific steps are as follows.

Step 701: detecting a target in the short-focus image acquired by the first short-focus sensor and the first long-focus image acquired by the long-focus sensor in real time; if the target is detected in the first short-focus image or the first long-focus image, controlling the Pan-Tilt platform to rotate until the target is located in the center of the first short-focus image or the first long-focus image, and when the target is located in the center of the first short-focus image or the first long-focus image, controlling the Pan-Tilt platform to stop rotating.

Step 702: performing the following steps 703-708 for two frames of images, the first short-focus image and the first long-focus image, acquired at the same time:

Step 703: obtaining a short-focus field-of-view cropping coefficient ZoomRatioc set currently and a pre-calculated ZoomRatios for cropping the field of view of the short-focus lens to the same as that of the long-focus lens, and determining whether ZoomRatioc<ZoomRatios, and if yes, executing step 704.

ZoomRatio may be expressed as the ratio of two different fields of view.

Figure 8:
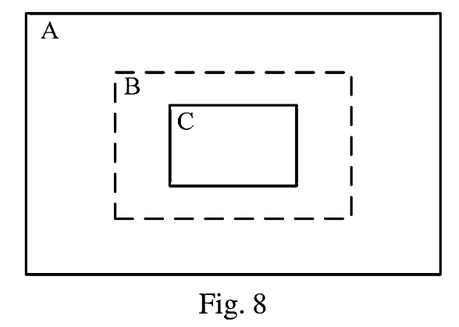
FIG. 8 is a schematic diagram of fields of view with different sizes.

In this embodiment, ZoomRatioc=the original field of view of the short-focus lens/the field of view after the field of view of the short-focus lens is cropped. FIG. 8 is a schematic diagram of fields of view with different sizes, in which the rectangular block A represents the original field of view of the short-focus lens, and if the field of view of the short-focus lens is cropped to the field of view represented by the rectangular block B, ZoomRatioc=SA/SB, where SA represents the area of the rectangular block A and SB represents the area of the rectangular block B;

ZoomRatios=the original field of view of the short-focus lens/the original field of view of the long-focus lens. For example, in FIG. 8, if the rectangular block C represents the original field of view of the long-focus lens, ZoomRatios=SA/SC, where SC represents the area of the rectangular block C.

Step 704: cropping the first short-focus image according to ZoomRatioc, and then enlarging the second short-focus image obtained through the cropping to the same size as the first short-focus image to obtain a third short-focus image.

Figure 9:
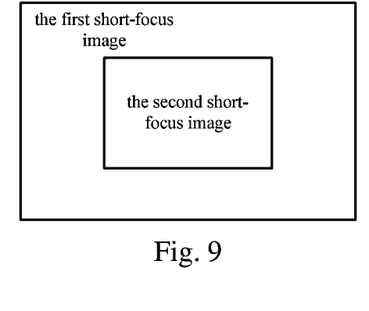
FIG. 9 is an exemplary diagram of field of view cropping of a first short-focus image according to an embodiment of the present application.

FIG. 9 is an exemplary diagram of cropping the field of view of the first short-focus image. If ZoomRatioc=4, the length and width of the first short-focus image are respectively cropped by ½, that is, the periphery (upper, lower, left and right) of the first short-focus image is respectively cropped by ¼, and the second short-focus image is obtained.

In order to make the second short-focus image obtained through the cropping still display normally, the second short-focus image is enlarged to the same size as the first short-focus image. For example, the second short-focus image shown in FIG. 9 is enlarged to the same size as the first short-focus image shown in FIG. 9. Amplification algorithm is not limited in this embodiment.

Step 705: according to the focal lengths of the short-focus lens and the long-focus lens and the ZoomRatioc, calculating a reduction coefficient ZoomRatiom corresponding to the first long-focus image when the sizes of the same target in the first long-focus image and in the third short-focus image are matched.

In order to fuse the first long-focus image with the third short-focus image, the same target on the third short-focus image and the first long-focus image must be matched. The registration contains two aspects: size registration and position registration, that is, after the first long-focus image is fused with the third short-focus image, the size and position of a target on the first long-focus image are completely matched with the size and position of the target on the third short-focus image.

Since the field of view of the long-focus lens is smaller than the field of view of the short-focus lens, it is necessary to reduce the first long-focus image during the size registration. The reduction coefficient ZoomRatiom is related to the focal lengths of the short-focus lens and the long-focus lens. In addition, since the first short-focus image is cropped and enlarged in step 704, the reduction coefficient ZoomRatiom is further related to ZoomRatioc.

Step 706: performing a reduction processing on the first long-focus image according to ZoomRatiom to obtain a second long-focus image.

Step 707: according to a relative angle of the current long-focus lens and the short-focus lens and ZoomRatioc, calculating a position of the second long-focus image in the third short-focus image when the positions of the same target in the second long-focus image and in the third short-focus image are matched.

Step 708: according to the position of the second long-focus image in the third short-focus image, covering the third short-focus image by the second long-focus image to obtain a fused image, and outputting the fused image to the display screen.

Covering means replacing the third short-focus image at the corresponding position with the second long-focus image.

Figure 10:
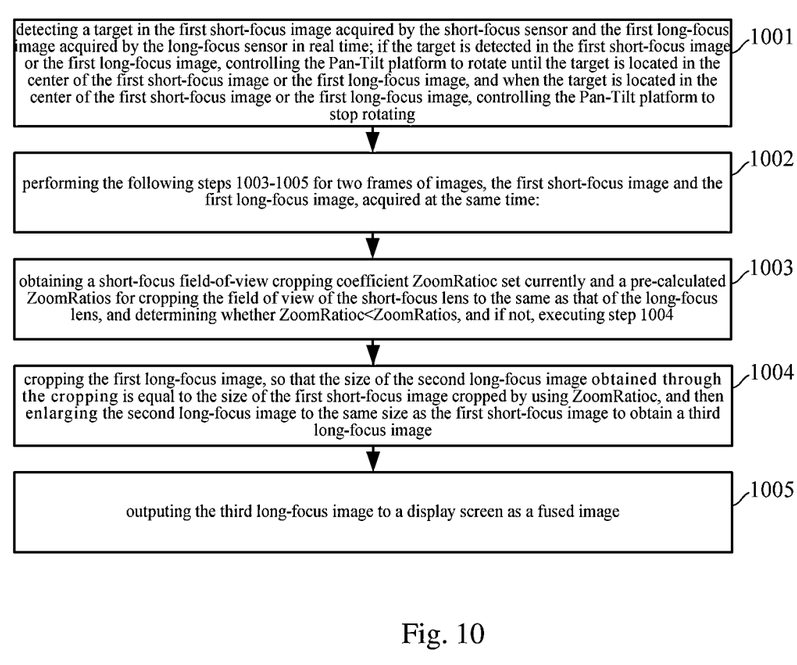
FIG. 10 is a flowchart of an image fusion method according to another embodiment of the present application.

FIG. 10 is a flowchart of an image fusion method according to another embodiment of the present application, and the specific steps are as follows.

Step 1001: detecting a target in the first short-focus image acquired by the first short-focus sensor and the first long-focus image acquired by the long-focus sensor in real time; if the target is detected in the first short-focus image or the first long-focus image, controlling the Pan-Tilt platform to rotate until the target is located in the center of the first short-focus image or the first long-focus image, and when the target is located in the center of the first short-focus image or the first long-focus image, controlling the Pan-Tilt platform to stop rotating.

Step 1002: performing the following steps 1003-1005 for two frames of images, the first short-focus image and the first long-focus image, acquired at the same time:

Step 1003: obtaining a short-focus field-of-view cropping coefficient ZoomRatioc set currently and a pre-calculated ZoomRatios for cropping the field of view of the short-focus lens to the same as that of the long-focus lens, and determining whether ZoomRatioc<ZoomRatios, and if not, executing step 1004.

ZoomRatio may be expressed as the ratio of two different fields of view.

In this embodiment, ZoomRatioc=the original field of view of the short-focus lens/the field of view after the field of view of the short-focus lens is cropped, and ZoomRatios=the original field of view of the short-focus lens/the original field of view of the long-focus lens.

Step 1004: cropping the first long-focus image, so that the size of the second long-focus image obtained through the cropping is equal to the size of the first short-focus image cropped by using ZoomRatioc, and then enlarging the second long-focus image to the same size as the first short-focus image to obtain a third long-focus image.

Step 1005: outputting the third long-focus image to a display screen as a fused image.

Figure 11:
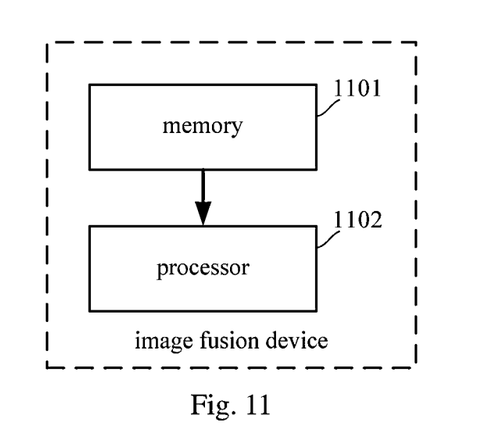
FIG. 11 is a structural diagram of an image fusion device according to an embodiment of the present application.

FIG. 11 is a structural diagram of an image fusion device provided in an embodiment of the present application, which mainly includes a memory 1101 and a processor 1102 that can access the memory 1101. The memory 1101 stores instructions which, when executed by the processor 1102, cause the processor 1102 to perform the steps of the method as described in steps 301-305, or steps 401-407, or steps 701-708, or steps 1001-1005.

The embodiment of the present application also provides a binocular Pan-Tilt platform long-focus and short-focus camera, which includes: a short-focus sensor connected to a short-focus lens, a long-focus sensor connected to a long-focus lens and a Pan-Tilt platform, wherein the short-focus sensor and the long-focus sensor rotate with the Pan-Tilt platform at the same time, or, the short-focus sensor is fixed and only the long-focus sensor rotates with the Pan-Tilt platform; in addition, the short-focus sensor and the long-focus sensor are respectively provided with an interface for communicating with the image fusion device, and send the original short-focus image and the original long-focus image respectively acquired to the image fusion device through the respective communication interfaces.

The embodiment of the present application also provides a computer-readable storage medium, in which a computer program is stored, and when the computer program is executed by a processor, any one of the image fusion methods described in the present application is realized.

In yet another embodiment provided by the present application, a computer program product containing instructions is also provided, which, when runs on a computer, causes the computer to execute any one of the image fusion method described in the present applications.

The above are only preferred embodiments of the present application, and it is not intended to limit the present application. Any modification, equivalent substitution, improvement, etc. made within the spirit and principle of the present application should be included in the scope of protection of the present application.

What is claimed is:

1. An image fusion method, comprising:
obtaining a first short-focus image and a first long-focus image respectively acquired by a short-focus sensor and a long-focus sensor at the same time;
according to focal lengths of a short-focus lens and a long-focus lens, calculating a reduction coefficient corresponding to the first long-focus image when sizes of a same target in the first long-focus image and in the first short-focus image are matched;
performing a reduction processing on the first long-focus image according to the reduction coefficient to obtain a second long-focus image;
according to a relative angle of the current long-focus lens and short-focus lens, calculating a position of the second long-focus image in the first short-focus image when positions of a same target in the second long-focus image and in the first short-focus image are matched;
according to a position of the second long-focus image in the first short-focus image, covering the first short-focus image by the second long-focus image to obtain a fused image;
wherein, the short-focus sensor is connected to the short-focus lens, the long-focus sensor is connected to the long-focus lens, and both the short-focus sensor and the long-focus sensor rotate with a Pan-Tilt platform at the same time, or, the short-focus sensor is fixed and only the long-focus sensor rotates with the Pan-Tilt platform,
wherein after obtaining the first short-focus image and the first long-focus image respectively acquired by the short-focus sensor and the long-focus sensor at the same time, and before calculating the reduction coefficient corresponding to the first long-focus image when the sizes of the same target in the first long-focus image and in the first short-focus image are matched, the method further comprises:
cropping the first short-focus image according to a preset short-focus field-of-view cropping coefficient, so that a field of view corresponding to the second short-focus image obtained through the cropping is equal to a field of view corresponding to the first short-focus image multiplied by the short-focus field-of-view cropping coefficient; enlarging the second short-focus image to a same size as the first short-focus image to obtain a third short-focus image;
according to the focal lengths of the short-focus lens and the long-focus lens, calculating the reduction coefficient corresponding to the first long-focus image when the sizes of the same target in the first long-focus image and in the first short-focus image are matched comprising:
according to the focal lengths of the short-focus lens and the long-focus lens and the short-focus field-of-view cropping coefficient, calculating the reduction coefficient corresponding to the first long-focus image when the sizes of the same target in the first long-focus image and in the third short-focus image are matched;
according to the relative angle of the current long-focus lens and short-focus lens, calculating the position of the second long-focus image in the first short-focus image when the positions of the same target in the second long-focus image and in the first short-focus image are matched comprising:
according to the relative angle of the current long-focus lens and short-focus lens and the short-focus field-of-view cropping coefficient, calculating a position of the second long-focus image in the third short-focus image when positions of the same target in the second long-focus image and in the third short-focus image are matched;
according to the position of the second long-focus image in the first short-focus image, covering the first short-focus image by the second long-focus image comprising:
according to the position of the second long-focus image in the third short-focus image, covering the third short-focus image by the second long-focus image.

2. The method according to claim 1, further comprising:
detecting a target in the short-focus image acquired by the short-focus sensor and the long-focus image acquired by the long-focus sensor in real time; if the target is detected in the short-focus image or the long-focus image, controlling the Pan-Tilt platform to rotate until the target is located in the center of the short-focus image or the long-focus image, and when the target is located in the center of the short-focus image or the long-focus image, controlling the Pan-Tilt platform to stop rotating.

3. The method according to claim 1, wherein after obtaining the first short-focus image and the first long-focus image respectively acquired by the short-focus sensor and the long-focus sensor at the same time, and before cropping the first short-focus image according to the preset short-focus field-of-view cropping coefficient, the method further comprises:
- determining whether a field of view obtained by multiplying the field of view corresponding to the first short-focus image by the short-focus field-of-view cropping coefficient is smaller than a field of view corresponding to the first long-focus image; if yes, directly cropping the first long-focus image, so that a field of view of the second long-focus image obtained through the cropping is equal to the field of view obtained by multiplying the field of view corresponding to the first short-focus image by the short-focus field-of-view cropping coefficient, and enlarging the second long-focus image to the same size as the first short-focus image to obtain the final fused image;
- and, if the field of view obtained by multiplying the field of view corresponding to the first short-focus image by the short-focus field-of-view cropping coefficient is equal to the field of view corresponding to the first long-focus image, directly using the first long-focus image as the final fused image;
- if the field of view obtained by multiplying the field of view corresponding to the first short-focus image by the short-focus field-of-view cropping coefficient is larger than the field of view corresponding to the first long-focus image, performing an action of cropping the first short-focus image according to the preset short-focus field-of-view cropping coefficient.

4. The method according to claim 1, wherein before obtaining the fused image, the method further comprises:
- performing a smoothing processing on edges of the second long-focus image in the fused image.

5. The method according to claim 4, further comprising:
- setting a size of a first transparency image to be equal to a size of the first long-focus image, and setting widths W of transition bands in pixels; wherein, the transition bands are located at four edges of the first transparency image and within a boundary of the first transparency image;
- for each of the transition bands at the four edges, setting values of individual pixels on the transition band, so that the values of the individual pixels increase in order from the boundary of the first transparency image to an interior of the first transparency image, in a range from 0 to 255;
- and, performing the smoothing processing on the edges of the second long-focus image in the fused image comprises:
- performing a reduction processing on the transparency image by the reduction coefficient corresponding to the first long-focus image to obtain a second transparency image;
- performing a coincidence of a center of the second transparency image with a center of the second long-focus image in the fused image, and for each of pixels in the fused image that coincides with a transition band of the second transparency image, replacing a pixel value of the pixel by: (a pixel value of the pixel in the second transparency image*a pixel value of the pixel in the second long-focus image in the fused image+(255−the pixel value of the pixel in the second transparency image)*a pixel value of the pixel in the covered third short-focus image in the fused image)/255.

6. The method according to claim 5, wherein, for each of the transition bands at the four edges, setting the values of the individual pixels on the transition band so that the values of the individual pixels increase in order from the boundary of the first transparency image to the interior of the image, in a range from 0 to 255, comprises:
- for the transition band at each of the edges, fitting pixel values of the pixels from the boundary of the transition band to the center of the transition band by a first quadratic function of one variable, and fitting pixel values of the pixels from the center of the transition band to the end of the transition band by a second quadratic function of one variable, wherein a quadratic coefficient of the first quadratic function with one variable is greater than 0, and a quadratic coefficient of the second quadratic function with one variable is less than 0.

7. An image fusion device, comprising: a memory and a processor that can access the memory having storing therein instructions which, when executed by the processor, cause the processor to perform the steps of the method according to claim 1.

8. An image fusion method, comprising:
- obtaining a first short-focus image and a first long-focus image corresponding to a current time that an image is to be output, wherein acquisition time of the first short-focus image is same as that of the first long-focus image, and a range of a field of view of the first long-focus image is within the range of the field of view of the first short-focus image;
- determining whether a range of a field of view corresponding to a current image to be output is larger than the range of the field of view range of the first long-focus image;
- if the range of the field of view corresponding to the current image to be output is larger than the range of the field of view range of the first long-focus image, extracting, according to the range of the field of view corresponding to the current image to be output, an image area for the corresponding range of the field of view in the first short-focus image to obtain a second short-focus image;
- determining a target area corresponding to the range of the field of view of the first long-focus image in the second short-focus image;
- superposing the first long-focus image that has been adjusted to a size of the target area on the target area of the second short-focus image to obtain a fused image;
- enlarging the fused image to a preset resolution and outputting the enlarged fused image,
- wherein before superposing the first long-focus image that has been adjusted to the size of the target area on the target area of the second short-focus image to obtain the fused image, the method further comprises:
- setting a size of the first transparency image to be equal to a size of the first long-focus image, and setting widths W of transition bands in pixels; wherein, the transition bands are located at four edges of a first transparency image and within a boundary of the first transparency image;
- for each of the transition bands at the four edges, setting values of individual pixels on the transition band so that the values of the individual pixels increase in order from the boundary of the first transparency image to an interior of the first transparency image, in a range from 0 to 255;
- performing a coincidence of a center of the first transparency image with a center of the first long-focus image, and for each of pixels in the fused image that coincide with the transition band of the first transparency image, replacing a pixel value of the pixel by: (a pixel value of the pixel in the first transparency image*a pixel value of the pixel in the first long-focus image in the fused image+(255−the pixel value of the pixel in the first transparency image)*a pixel value of the pixel in the covered second short-focus image in the fused image)/255.

9. The method according to claim 8, wherein after determining whether the range of the field of view corresponding to the current image to be output is larger than the range of the field of view range of the first long-focus image, the method further comprises:
- if the range of the field of view corresponding to the current image to be output is not larger than the range of the field of view range of the first long-focus image, extracting, according to the range of the field of view corresponding to the current image to be output, an image area for the corresponding range of the field of view in the first long-focus image to obtain a second long-focus image;
- enlarging the second long-focus image to a preset resolution and outputting the enlarged second long-focus image.

10. The method according to claim 8, wherein, for each of the transition bands at the four edges, setting the values of the individual pixels on the transition band so that the values of the individual pixels increase in order from the boundary of the first transparency image to the interior of the first transparency image, in the range from 0 to 255, comprises:
- for the transition band at each of the edges, fitting pixel values of the pixels from the boundary of the transition band to the center of the transition band by a first quadratic function of one variable, and fitting pixel values of the pixels from the center of the transition band to the end of the transition band by a second quadratic function of one variable, wherein a quadratic coefficient of the first quadratic function of one variable is greater than 0, and a quadratic coefficient of the second quadratic function of one variable is less than 0.

11. An image fusion device, comprising: a memory and a processor that can access the memory having storing therein instructions which, when executed by the processor, cause the processor to perform the steps of the method according to claim 8.

* * * * *